(12) United States Patent
Kikuchi

(10) Patent No.: US 6,909,897 B2
(45) Date of Patent: Jun. 21, 2005

(54) INFORMATION DELIVERY SYSTEM

(75) Inventor: Tsuneyuki Kikuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 325 days.

(21) Appl. No.: 10/357,432

(22) Filed: Feb. 4, 2003

(65) Prior Publication Data

US 2003/0148763 A1 Aug. 7, 2003

(30) Foreign Application Priority Data

Feb. 5, 2002 (JP) ........................................ 2002-028062

(51) Int. Cl.[7] .............................................. H04Q 7/20
(52) U.S. Cl. ..................... 455/433; 455/411; 455/435.1; 455/435.2
(58) Field of Search ............................... 455/433, 411, 455/435.2, 435.1, 3.01, 3.04, 3.05, 403, 414.1, 422.1, 423, 434

(56) References Cited

U.S. PATENT DOCUMENTS

| | | | | |
|---|---|---|---|---|
| 5,881,235 A | * | 3/1999 | Mills | 709/221 |
| 5,884,157 A | * | 3/1999 | Karmi | 455/406 |
| 6,122,509 A | * | 9/2000 | Nguyen | 455/433 |
| 6,201,971 B1 | * | 3/2001 | Purnadi et al. | 455/450 |
| 6,240,293 B1 | * | 5/2001 | Koster | 455/445 |
| 6,449,479 B1 | * | 9/2002 | Sanchez | 455/433 |
| 6,850,755 B2 | * | 2/2005 | Allande et al. | 455/406 |
| 2003/0083068 A1 | * | 5/2003 | Wong | 455/435 |

FOREIGN PATENT DOCUMENTS

| | | |
|---|---|---|
| JP | 11-55726 | 2/1999 |
| JP | 2000-29932 | 1/2000 |
| JP | 2000-155757 | 6/2000 |
| JP | 2001-203811 | 7/2001 |
| JP | 2001-209698 | 8/2001 |

* cited by examiner

*Primary Examiner*—CongVan Tran
(74) *Attorney, Agent, or Firm*—McGinn & Gibb, PLLC

(57) ABSTRACT

An information delivery system includes a mobile terminal of a user, a home domain, and an access destination domain for a specific area to which the mobile terminal currently belongs. The access destination domain transmits a selected service data of a group of service data about the specific area to the mobile terminal when acquiring an identifier of the mobile terminal, and transmits a user personal data request with the identifier of the mobile terminal to the home domain. The home domain transmits user personal data corresponding to the identifier to the access destination domain in response to the user personal data request, and the user personal data indicates features of the user. The access destination domain updates statistic data based on the user personal data, and previously selects one of the group of service data as the selected service data based on the updated statistic data.

44 Claims, 11 Drawing Sheets

Fig. 2A
SUBSCRIBER DATA

| MOBILE TERMINAL ID | ? | ADDRESS | SEXUALITY | AGE | OCCUPATION | ANNUAL INCOME |
|---|---|---|---|---|---|---|
| A0000001 | ? | YOKOHAMA | MAN | 33 | DOCTOR | 1500 |
| A0000002 | ? | FUCHU | WOMAN | 21 | OFFICE WORKER | 400 |
| A0000003 | ? | ABIKO | WOMAN | 17 | STUDENT | 50 |
| ...... | : | ...... | ...... | ...... | ...... | ...... |

Fig. 2B
INTEREST DATA

| MOBILE TERMINAL ID | INTEREST | MAKER | PURCHASE PERIOD | PURCHASE ACCOUNT | ? |
|---|---|---|---|---|---|
| A0000001 | GOLF | ○○○ | 33 | 150 | ? |
| A0000002 | TRIP | △△△ | 21 | 10 | ? |
| A0000003 | MUSIC | NOT PARTIC. | 17 | 5 | ? |
| ...... | ...... | ...... | ...... | ...... | : |

Fig. 4

| TIME ZONE OCCUPATION | | 8-12 | 12-16 | 16-20 | 20-24 | TOTAL |
|---|---|---|---|---|---|---|
| DOCTOR | ~ | 0 | 0 | 0 | 1 | 2 |
| OFFICE WORKER | ~ | 0 | 0 | 128 | 318 | 451 |
| STUDENT | ~ | 55 | 314 | 140 | 12 | 552 |
| ...... | ⋮ | ⋮ | ⋮ | ⋮ | ⋮ | ⋮ |

Fig. 5

|  | TIME ZONE | | | SEXUALITY | | AGE | | | ... |
|---|---|---|---|---|---|---|---|---|---|
|  | 8-12 | ... | 20-24 | MAN | WOMAN | 10 | 20 | 30 | |
| SERVICE DATA 1 | 1 | ... | 0 | 1 | 0 | 1 | 0 | 0 | ... |
| SERVICE DATA 2 | 1 | ... | 0 | 1 | 0 | 0 | 1 | 0 | ... |
| ⋮ | ⋮ | ⋮ | ⋮ | ⋮ | ⋮ | ⋮ | ⋮ | ⋮ | ⋮ |
| SERVICE DATA n | ... | ... | ... | ... | ... | ... | ... | ... | ... |

Fig. 7

| ROUTER ID | VISITORS DURING 16 - 20 |
|---|---|
| R43528 | 128 |
| R00033 | 112 |
| R08867 | 46 |
| ...... | ...... |

INFORMATION DELIVERY SYSTEM

BACKGROUND OF THE INVENTION

1. Field of the Invention

The present invention relates to an information delivery system to a user in a specific area, and more particularly to the technique for delivering information to a mobile terminal in a specific area.

2. Description of the Related Art

Conventionally, an information delivery system is known in which contents or electronic data about shops and attractions previously prepared for collecting visitors are delivered to mobile terminals of the visitor in a specific area such as a shopping mall and a theme park. In the conventional information delivery system, however, the same contents are evenly delivered to all the visitors. It is not carried out to deliver the contents suitable for each visitor. Therefore, even if the goods desired by the visitor are sold at a shop in the shopping mall, the visitor cannot sometimes purchase the goods. Thus, the shop has lost a business chance.

For this reason, a recommendation system is being introduced which automatically recommends contents or goods fitting with the interest of the user based on access records and purchase records in large-scaled Web sites (portal site) such as a search site and a news site which the user first accesses on a network. As such a recommendation system, a mobile communication system is disclosed in Japanese Laid Open Patent Application (JP-P2001-203811). In this first conventional example, a user of a mobile terminal can easily receive a data service suitable for the life style and interest of the user. In the mobile communication system of the first conventional example, an information service apparatus carries out an information service process based on an information service program. A position data of a mobile terminal of a user is received from a switching apparatus and outputted to an estimating and accumulating apparatus. Also, the information service apparatus reads customer data from a customer database, and reads interest data of the mobile terminal user from a customer interest database based on the customer data and outputs to the estimating and accumulating apparatus. The estimating and accumulating apparatus estimates menu data based on the position data and the interest data, and delivers to the mobile terminal via the switching apparatus.

This recommendation system is very expensive and it is large load on a provider to introduce the recommendation system into a small site. Also, in the recommendation system, when a user accesses the site and puts an article in a shopping basket, other articles are recommended to the user. Through the above operation, the interest of the user is searched and registered on the customer interest database. When the user enters a specific are, the recommendation system searches articles or contents from the customer interest database in accordance with predetermined rules. Therefore, it takes a long time until the menu data to be delivered are determined. As a result, the menu data suitable for the user cannot be delivered at the timing that the user enters the specific area.

Also, an information delivery system is disclosed in Japanese Laid Open Patent Application (JP-P2001-209698A). In this second conventional example, first data useful to a user in a specific area and a delivery time of the first data are previously registered. At the delivery time, a part of the first data is delivered to a mobile terminal of the user who visits the specific area. At this time, the part of the first data matches to attribute data of the user. Second data different from the first data is delivered to a mobile terminal of another user who is not present in the specific area. Thus, the second conventional example intends to solve the problem of the recommendation system. In the second conventional example, however, the user needs to contract a provider and to carry out member registration, before the user visits the specific area. Also, the object to which the information delivery system is applied is the user who visits the specific area repeatedly. Therefore, the service cannot be provided to a new user who visits the specific area by chance.

In conjunction with the above description, a method of extracting a feature of a moving object is disclosed in Japanese Laid Open Patent Application (JP-P2000-155757A). In this third conventional example, a visit data acquiring section acquires place data based on position data of a detected position of a user and a map database. Also, a situation in which the user visits the detected position is registered as situation data. The place data and the situation data are related to each other and accumulated in a visit database as visit data. A feature extracting section analyzes the accumulated visit data, and extracts a movement pattern of the user. A using section implements a process for the extracted movement pattern in accordance with predetermined rules.

Also, a guidance method using a user detecting function is disclosed in Japanese Laid Open Patent Application (JP-P2000-029932A). In this fourth conventional example, a system detects and specifies a user, and provides data necessary to the user to the user without any complicated operations by the user. Also, the system dynamically provides the necessary data to the user in a form determined in accordance with purpose, necessity, and interest of the user.

Also, an information guidance method to a mobile terminal user is disclosed in Japanese Laid Open Patent Application (JP-A-Heisei 11-55726). In this fifth conventional example, a current position of the mobile terminal is monitored by an information guidance server via an access point and a network, and the server provides area data corresponding to the current position and data of another user to the mobile terminal.

SUMMARY OF THE INVENTION

Therefore, an object of the present invention is to provide an information delivery system and method, in which data service can be carried out to a user who visits a specific area for the first time, in addition to another user who has visited the specific area frequently.

In an aspect of the present invention, an information delivery system includes a mobile terminal of a user, a home domain, and an access destination domain for a specific area to which the mobile terminal currently belongs. The access destination domain transmits a selected service data of a group of service data about the specific area to the mobile terminal when acquiring an identifier of the mobile terminal, and transmits a user personal data request with the identifier of the mobile terminal to the home domain. The home domain transmits user personal data corresponding to the identifier to the access destination domain in response to the user personal data request, and the user personal data indicates features of the user. The access destination domain updates statistic data based on the user personal data, and previously selects one of the group of service data as the selected service data based on the updated statistic data.

Here, the home domain may include a first a first database and a home agent. The first database stores the user personal data. The home agent reads out the user personal data from the database based on the identifier of the mobile terminal in response to the user personal data request, and transmits the read out user personal data to the access destination domain. In this case, the user personal data contains at least one of address, sexuality, age, occupation, annual income, interest, preferable maker and purchase account of the user.

Also, the access destination domain may include a second database which stores the group of service data, a third database which stores the statistic data, and a mobile router. The mobile router refers to the second database to read out the selected service data when acquiring the identifier of the mobile terminal, transmits the selected service data to the mobile terminal and the user personal data request to the home domain, receives the user personal data from the home domain, refers to the third database to update the statistic data based on the user personal data, and previously selects the selected service data from the group of service data based on the updated statistic data. In this case, the access destination domain may further include a timer, and the second database may store a plurality of the service data for every user personal data and for every time zone. The mobile router refers to the third database to update the statistic data based on the user personal data and a current time zone for a current time measured by the timer, and previously selects the selected service data from the group of service data based on the updated statistic data. In this case, the home domain may transmit a statistic data request to the access destination domain, and the mobile router may read out the statistic data from the third database and transmits to the home domain. The home domain may generate and store ranking data of a number of the users, from whose mobile terminals the mobile router acquires the identifiers, in units of the features of the user personal data.

In another aspect of the present invention, an information delivery system includes a mobile terminal of a user, a network service provider system of a network service provider which has a home domain and a first access destination domain, and a data delivery servicer system of a data delivery servicer which has a second access destination domain for a specific area to which the mobile terminal currently belongs. The network service provider contracts with the data delivery servicer to provide user personal data, and the user personal data indicating features of the user. The second access destination domain may transmit a selected service data of a group of service data about the specific area to the mobile terminal when acquiring an identifier of the mobile terminal, and transmit a user personal data request with the identifier of the mobile terminal to the home domain via the first access destination domain. The home domain may transmit the user personal data corresponding to the identifier to the second access destination domain via the first access destination domain in response to the user personal data request. The second access destination domain may update statistic data based on the user personal data, and previously select one of the group of service data as the selected service data based on the updated statistic data. In this case, the home domain may include a first database storing the user personal data, and a home agent. The home agent may read out the user personal data from the first database based on the identifier of the mobile terminal in response to the user personal data request, and transmit the read out user personal data to the second access destination domain via the first access destination domain. In this case, the user personal data desirably contains at least one of address, sexuality, age, occupation, annual income, interest, preferable maker and purchase account of the user.

Also, the second access destination domain may include a second database which stores the group of service data, a third database which stores the statistic data, and a mobile router. The mobile router may refer to the second database to read out the selected service data when acquiring the identifier of the mobile terminal, transmit the selected service data to the mobile terminal and the user personal data request to the home domain via the first access destination domain, receive the user personal data from the home domain via the first access destination domain, refer to the third database to update the statistic data based on the user personal data, and previously select the selected service data from the group of service data based on the updated statistic data. In this case, the access destination domain further may include a timer. The mobile router refers to the third database to update the statistic data based on the user personal data and a current time zone for a current time measured by the timer, and previously selects the selected service data from the group of service data based on the updated statistic data. Also, the home domain may transmit a statistic data request to the access destination domain via the first access destination domain. The mobile router reads out the statistic data from the third database and transmits to the home domain via the first access destination domain. The home domain generates and stores ranking data of a number of the users, from whose mobile terminals the mobile router acquires the identifiers, in units of the features of the user personal data.

Also, when the contract is changed, the network service provider system may send a contract change notice to the second access destination domain via the first access destination domain. The data delivery servicer system replies a permission to the home domain via the first access destination domain.

In another aspect of the present invention, an information delivery system includes a mobile terminal of a user, a home domain which has a home agent, and a first intermediate domain for a first area. The first intermediate domain includes a first access destination domain for a second area in the first area, a second access destination domain for a third area in the first area, and a gateway connected with the home domain. When the mobile terminal enters the third area from the second area, the second access destination domain acquires an identifier of the mobile terminal, transmits a selected service data of a group of service data for the third area to the mobile terminal and transmits a movement notice with the identifier to the gateway. The gateway transmits a user personal data request with the identifier to the first access destination domain in response to the movement notice. The first access destination domain transmits user personal data corresponding to the identifier to the second access destination domain, the user personal data indicating features of the user. The second access destination domain updates statistic data based on the user personal data, and previously selects one of the group of service data as the selected service data based on the updated statistic data.

Here, the first access destination domain may include a first database storing the user personal data, and a first mobile router. The first mobile router may read out the user personal data from the first database based on the identifier of the mobile terminal in response to the user personal data request, and transmit the read out user personal data to the second access destination domain. Also, the user personal data desirably contains at least one of address, sexuality, age, occupation, annual income, interest, preferable maker and purchase account of the user.

Also, the second access destination domain may include a second database which stores the group of service data, a third database which stores the statistic data, and a second mobile router. The second mobile router may refer to the second database to read out the selected service data when acquiring the identifier of the mobile terminal, transmit the selected service data to the mobile terminal and the user personal data request to the home domain, receive the user personal data from the home domain, refer to the third database to update the statistic data based on the user personal data, and previously select the selected service data from the group of service data based on the updated statistic data. In this case, the second access destination domain may further include a timer, and the second database stores a plurality of the service data for every user personal data and for every time zone. The second mobile router refers to the timer to determine a time zone, reads out the service data for the third area from the second database based on the user personal data and the time zone, and transmits the read out service data to the mobile terminal.

In another aspect of the present invention, an information delivery system includes a mobile terminal of a user, a home domain which has a home agent, a first intermediate domain for a first area, which has a first access destination domain and a first gateway, and a second intermediate domain for a second area, which has a second access destination domain and a second gateway. When the mobile terminal enters the second area from the first area, the second access destination domain acquires an identifier of the mobile terminal, transmits a selected service data of a group of service data about the second area to the mobile terminal and transmits a movement notice with the identifier to the second gateway. The second gateway transmits the movement notice with the identifier to the home agent. The home agent transmits a user personal data request with the identifier to the first gateway in response to the movement notice. The first gateway transmits the user personal data request with the identifier to the first access destination domain. The first access destination domain transmits user personal data corresponding to the identifier to the second access destination domain, and the user personal data indicates features of the user. The second access destination domain updates statistic data based on the user personal data, and previously selects one of the group of service data as the selected service data based on the updated statistic data.

Here, the first access destination domain may include a first database storing the user personal data, and a first mobile router. The first mobile router may read out the user personal data from the first database based on the identifier of the mobile terminal in response to the user personal data request, and transmit the read out user personal data to the second access destination domain. Also, the user personal data contains at least one of address, sexuality, age, occupation, annual income, interest, preferable maker and purchase account of the user.

Also, the second access destination domain may include a second database which stores the group of service data, a third database which stores the statistic data, and a second mobile router. The second mobile router may refer to the second database to read out the selected service data when acquiring the identifier of the mobile terminal, transmit the selected service data to the mobile terminal and the user personal data request to the home domain, receives the user personal data from the home domain, refer to the third database to update the statistic data based on the user personal data, and previously select the selected service data from the group of service data based on the updated statistic data. In this case, the second access destination domain may further include a timer, and the second database stores a plurality of the service data for every user personal data and for every time zone. The second mobile router refers to the timer to determine a time zone, reads out the service data for the second area from the second database based on the user personal data and the time zone, and transmits the read out service data to the mobile terminal.

In another aspect of the present invention, an information delivery system includes a mobile terminal of a user, a home domain, and an access destination domain for a specific area to which the mobile terminal currently belongs. The access destination domain transmits a user personal data request with an identifier of the mobile terminal to the home domain when the mobile terminal enters the specific area. The home domain transmits user personal data corresponding to the identifier to the access destination domain in response to the user personal data request, the user personal data indicating features of the user. The access destination domain determines a selected service data of a group of service data about the specific area based on the user personal data, and transmits the selected service data to the mobile terminal.

Here, the home domain may include a first database storing the user personal data, and a home agent which reads out the user personal data from the first database based on the identifier of the mobile terminal in response to the user personal data request, and transmits the read out user personal data to the access destination domain. Also, the user personal data desirably contains at least one of address, sexuality, age, occupation, annual income, interest, preferable maker and purchase account of the user.

Also, the access destination domain may include a second database which stores service data, and a mobile router which receives the user personal data from the home domain, reads out the service data for the specific area from the second database based on the user personal data, and transmits the read out service data to the mobile terminal. In this case, the access destination domain may further include a timer, and the second database stores a plurality of the service data for every user personal data and for every time zone. The mobile router refers to the timer to determine a time zone, reads out the service data for the specific area from the second database based on the user personal data and the time zone, and transmits the read out service data to the mobile terminal.

In another aspect of the present invention, an information delivery system includes a mobile terminal of a user, a network service provider system of a network service provider which has a home domain and a first access destination domain, and a data delivery servicer system of a data delivery servicer which has a second access destination domain for a specific area to which the mobile terminal currently belongs, the network service provider contracts with the data delivery servicer to provide user personal data. The user personal data indicates features of the user. The second access destination domain transmits a user personal data request with an identifier of the mobile terminal to the home domain via the first access destination domain, when the mobile terminal enters the specific area. The home domain transmits the user personal data corresponding to the identifier to the second access destination domain via the first access destination domain in response to the user personal data request. The second access destination domain determines a specific service data of a group of service data based on the user personal data and transmits the specific service data to the mobile terminal. In this case, the home domain may include a first database storing the user personal data, and a home agent. The home agent reads out the user personal data from the first database based on the identifier of the mobile terminal in response to the user personal data request, and transmits the read out user personal data to the second access destination domain via the first access destination domain. The user personal data desirably contains at least one of address, sexuality, age, occupation, annual income, interest, preferable maker and purchase account of the user.

Also, the second access destination domain may include a second database which stores the group of service data, and a mobile router. The mobile router may acquire the identifier of the mobile terminal when the mobile terminal enters the specific area, transmit the user personal data with the identifier to the home domain via the first access destination domain, receive the user personal data from the home domain via the first access destination domain, refer to the second database based on the user personal data to determine the specific service data, and transmit the specific service data to the mobile terminal. In this case, the second access destination domain may further include a timer, and the second database stores the group of service data for feature of the user personal data and for every time zone. The mobile router refers to the timer to determine a time zone, reads out the specific service data for the specific area from the second database based on the user personal data and the time zone, and transmits the read out specific service data to the mobile terminal.

Also, when the contract is changed, the network service provider system may send a contract change notice to the second access destination domain via the first access destination domain. The data delivery servicer system replies a permission to the home domain via the first access destination domain.

In another aspect of the present invention, an information delivery system includes a mobile terminal of a user, a home domain which has a home agent, and a first intermediate domain for a first area. The first intermediate domain includes a first access destination domain for a second area in the first area, a second access destination domain for a third area in the first area, and a gateway connected with the home domain. When the mobile terminal enters the third area from the second area, the second access destination domain acquires an identifier of the mobile terminal, and transmits a movement notice with the identifier to the gateway. The gateway transmits a user personal data request with the identifier to the first access destination domain in response to the movement notice. The first access destination domain transmits user personal data corresponding to the identifier to the second access destination domain, the user personal data indicating features of the user. The second access destination domain determines a specific service data of a group of service data based on the user personal data and transmits the specific service data for the third area to the mobile terminal. In this case, the first access destination domain may include a first database storing the user personal data, and a first mobile router which reads out the user personal data from the first database based on the identifier of the mobile terminal in response to the user personal data request, and transmits the read out user personal data to the second access destination domain. In this case, the user personal data desirably contains at least one of address, sexuality, age, occupation, annual income, interest, preferable maker and purchase account of the user.

Also, the second access destination domain may include a second database which stores the group of service data, and a second mobile router which receives the user personal data from the first access destination domain, reads out the specific service data for the third area from the second database based on the user personal data, and transmits the read out specific service data to the mobile terminal. In this case, the second access destination domain further may include a timer, and the second database stores a plurality of the service data for every user personal data and for every time zone. The second mobile router refers to the timer to determine a time zone, reads out the specific service data for the third area from the second database based on the user personal data and the time zone, and transmits the read out specific service data to the mobile terminal.

In another aspect of the present invention, an information delivery system includes a mobile terminal of a user, a home domain which has a home agent, a first intermediate domain for a first area, which has a first access destination domain and a first gateway, and a second intermediate domain for a second area, which has a second access destination domain and a second gateway. When the mobile terminal enters the second area from the first area, the second access destination domain acquires an identifier of the mobile terminal, and transmits a movement notice with the identifier to the second gateway. The second gateway transmits a user personal data request to the home agent, and the home agent transmits a user personal data request with the identifier to the first gateway in response to the movement notice. The first gateway transmits the user personal data request with the identifier to the first access destination domain, and the first access destination domain transmits user personal data corresponding to the identifier to the second access destination domain. The user personal data indicates features of the user. The second access destination domain determines a specific service data of a group of service data based on the user personal data and transmits the specific service data for the second area to the mobile terminal.

Here, the first access destination domain may include a first database storing the user personal data, and a first mobile router which reads out the user personal data from the first database based on the identifier of the mobile terminal in response to the user personal data request, and transmits the read out user personal data to the second access destination domain. The user personal data desirably contains at least one of address, sexuality, age, occupation, annual income, interest, preferable maker and purchase account of the user.

Also, the second access destination domain may include a second database which stores the group of service data, and a second mobile router which acquires the identifier of the mobile terminal when the mobile terminal enters the second area from the first area, transmits the movement notice with the identifier to the second gateway, receives the user personal data from the first access destination domain, reads out the specific service data for the second area from the second database based on the user personal data, and transmits the read out specific service data to the mobile terminal. In this case, the second access destination domain may further include a timer, and the second database stores a plurality of the service data for every user personal data and for every time zone. The second mobile router refers to the timer to determine a time zone, reads out the specific service data for the second area from the second database based on the user personal data and the time zone, and transmits the read out specific service data to the mobile terminal.

BRIEF DESCRIPTION OF THE DRAWINGS

FIGS. 2A and 2B are diagrams showing a subscriber data database and an interest data database used by the information delivery system according to the first embodiment of the present invention;

FIG. 4 is diagram showing an example of a statistic data generated by the information delivery system according to the first embodiment of the present invention;

FIG. 5 is a diagram showing a service data selection table used in the information delivery system according to the first embodiment of the present invention;

FIG. 7 is a diagram showing an example of ranking data generated by the home agent in the information delivery system according to the first embodiment of the present invention;

DESCRIPTION OF THE PREFERRED EMBODIMENTS

Hereinafter, an information delivery system of the present invention will be described in detail with reference to the attached drawings.

Figure 1:
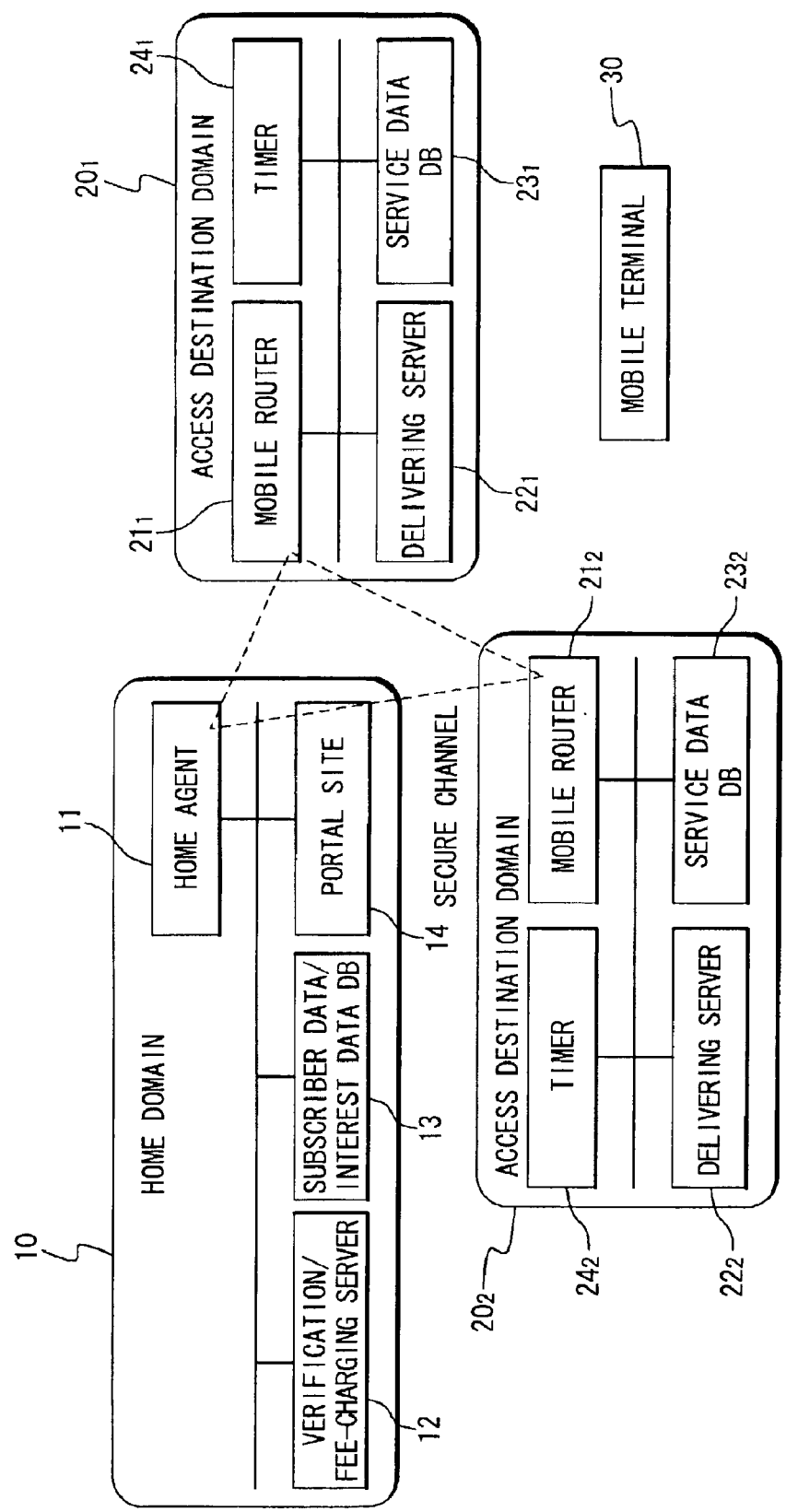
FIG. 1 is a block diagram showing the configuration of an information delivery system according to a first embodiment of the present invention.

FIG. 1 is a diagram showing the configuration of the information delivery system according to the first embodiment of the present invention. The information delivery system is composed of a home domain 10, a plurality of access destination domains $20_1$, $20_2$, . . . and a mobile terminal 30. The plurality of access destination domains $20_1$, $20_2$, . . . are same in the configuration and function. Therefore, only the access destination domain $20_1$ will be described.

Referring to FIG. 1, the home domain 10 is composed of one or more data processors. A home agent 11, a verification/fee-charging server 12, a subscriber data/interest data database (DB) 13 and a portal site 14 are formed by the data processors.

The subscriber data/interest data database 13 accumulates subscriber data and interest data of a user of the mobile terminal 30. FIG. 2A shows an example of the subscriber data accumulated in the subscriber data/interest data database 13 of the home domain 10. The subscriber data is acquired at the time of service contract, and is stored using the ID of the mobile terminal 30 as a key. The subscriber data contains an address, sexuality, age, occupation and annual income of the user for every mobile terminal. FIG. 2B shows an example of the interest data accumulated in the subscriber data/interest data database 13. The interest data is acquired from access records and purchase records in the portal site 14, questionnaire result and so on, and is stored using the ID of the mobile terminal 30 as a key. The interest data contains an interest, preferable maker, purchase period, and purchase account of the user for every mobile terminal. A set of the subscriber data and the interest data are referred to as user personal data. Because a method of acquiring the subscriber data and the interest data is not directly related with the present invention, the detail description is omitted.

The verification/fee-charging server 12 carries out a verification process of the user of the mobile terminal 30 and a process for a fee charging process for a total of purchase fees in the portal site 14 and for various services. The portal site 14 accommodates a content provider.

The home agent 11 provides a movement controlling function. Also, the home agent 11 receives a user personal data request with an identifier of the mobile terminal 30 from the access destination domain 201, and searches the database 13 for the user personal data based on the identifier of the mobile terminal 30. Then, the home agent 11 transmits the user personal data corresponding to the identifier to a mobile router $21_1$ in the access destination domain $20_1$ in response to a user personal data request from the mobile router $21_1$.

The access destination domain $20_1$ has a function of a radio access point and forms a cell with a specific area. The access destination domain $20_1$ is composed of one or more processors. In the access destination domain $20_1$, a mobile router $21_1$, a delivering server $22_1$, a service data database (DB) $23_1$, and a timer $24_1$ are formed by the data processors.

The service data database $23_1$ stores a service data select table. The service data select table has at least one of a feature of a time zone, and features of an address, sexuality, age, occupation, annual income, interest, preferable maker, purchase period, and purchase account of the user as condition. The time zone is determined by referring to the timer $24_1$ by the mobile router $21_1$. An example of the service data select table is shown in FIG. 5. Each feature is has at least a range. For example, the time zone has 5 ranges such as a range of 8:00–12:00, a range of 12:00–16:00, a range of 16:00–20:00, a range of 20:00–24:00, and a range of total count, as shown in FIG. 4. As to the sexuality, a range of man and a range of woman are provided. The service data select table has one service data number for a set of all the ranges of the categories.

The delivering server $22_1$ stores a group of service data for the service data numbers and delivers specific service data as contents to the mobile terminal 30 in response to a service data provide instruction from the mobile router $21_1$. The mobile router $21_1$ transmits the user personal data request with the identifier of the mobile terminal 30 to the home agent 11 of the home domain when acquiring an identifier of the mobile terminal 30. Also, the mobile router $21_1$ receives the user personal data corresponding to the identifier from the home agent 11 in the home domain 10. Then, the mobile router $21_1$ calculates statistic data based on the user personal data, and updates the service data select table.

The mobile terminal 30 is a small size data terminal such as a mobile phone and a PDA (Personal Digital Assistant).

In the information delivery system in the first embodiment, the home domain is managed under a network service provider. Each of the access destination domains is managed under a data delivery servicer.

As a mechanism to provide the movement controlling function by the home agent in the home domain, "mobile IP and mobile IPv6" are standardized in IETF (Internet Engineering Task Force). In the first embodiment, the standard of "mobile IP and mobile IPv6" is applied, and it can be recognized that the mobile terminal 30 enters the specific area. Also, a secure channel is previously established between the home agent 11 and mobile router 21 ($21_1$, $21_2$, . . . ) and the security of the data for transmission and reception between them is protected.

Next, an operation of the information delivery system according to the first embodiment of the present invention will be described with reference to the sequence diagram shown in FIG. 3. The sequence diagram shows a process flow in the home agent 11 and the mobile router $21_1$ when service data is delivered to the mobile terminal 30 when the user with the mobile terminal 30 moves into the specific area of the access destination domain $20_1$.

The mobile router $21_1$ acquires the identifier of the mobile terminal 30 when the user with the mobile terminal 30 moves into the specific area of the access destination domain $20_1$ (Step S101). Subsequently, the delivering server $22_1$ delivers a selected service data to the mobile terminal 30 via the mobile router $21_1$ in accordance with a service data provide instruction from the mobile router $21_1$ (Step S102).

Subsequently, the mobile router $21_1$ transmits a user personal data request with the identifier of the mobile terminal 30 to the home agent 11 (Step S103). The home agent 11 receives the user personal data request and searches the subscriber data/interest data database 13 based on the identifier of the mobile terminal 30 in response to the request (Step S104), because the subscriber data and the interest data of the user personal data are accumulated in the database 13. Then, the home agent 11 transmits the searched user personal data to the mobile router $21_1$ (S105).

The mobile router $21_1$ calculates statistic data of the service data select table based on the received user personal data to update the service data select table (Step S106). That is, the mobile router $21_1$ counts up by one, the contents of ranges of the service data select table corresponding to the features of the user personal data and the feature of the time zone. FIG. 4 shows an example of a part of the service data select table counted by the mobile router $21_1$ but the table part is rewritten for convenience of the description. In this example, the number of visitors in each of a plurality of the time zones is simply counted for every occupation. However, it is possible to change the counting method in response to an instruction from the home agent 11. For example, the counting operation may be carried out while changing the time zone into a unit of one month or one day of a week. Also, the visits of the same person plural times may be counted as once.

The mobile router $21_1$ selects one of the service data numbers of the service data select table after the update. For example, in the time zone of 16:00–20:00, the students most visit the specific area of the access destination domain $20_1$. Therefore, the mobile router $21_1$ selects the service data number such that the service data as the contents for the students is transmitted to the mobile terminal 30 by the delivering server $22_1$ at the step S102 for the next time. In this way, the service data to be delivered is previously determined. Therefore, the service data can be delivered to the mobile terminal 30 immediately when the user enters the specific area of the access destination domain $20_1$. That is, the service data to be delivered to the mobile terminal 30 can be previously prepared based on the service data select table to fit to a layer of users visiting the specific area in the time zone. As a result, even when the user comes into the specific area first, it is possible to provide the contents in which the user has an interest. Also, in the present invention, the service data can be dynamically changed based on the number of visitors.

It should be noted that in the example of FIG. 4, the visitors are counted for the time zone. However, the visitors may be counted for every feature of the user personal data.

Figure 6:
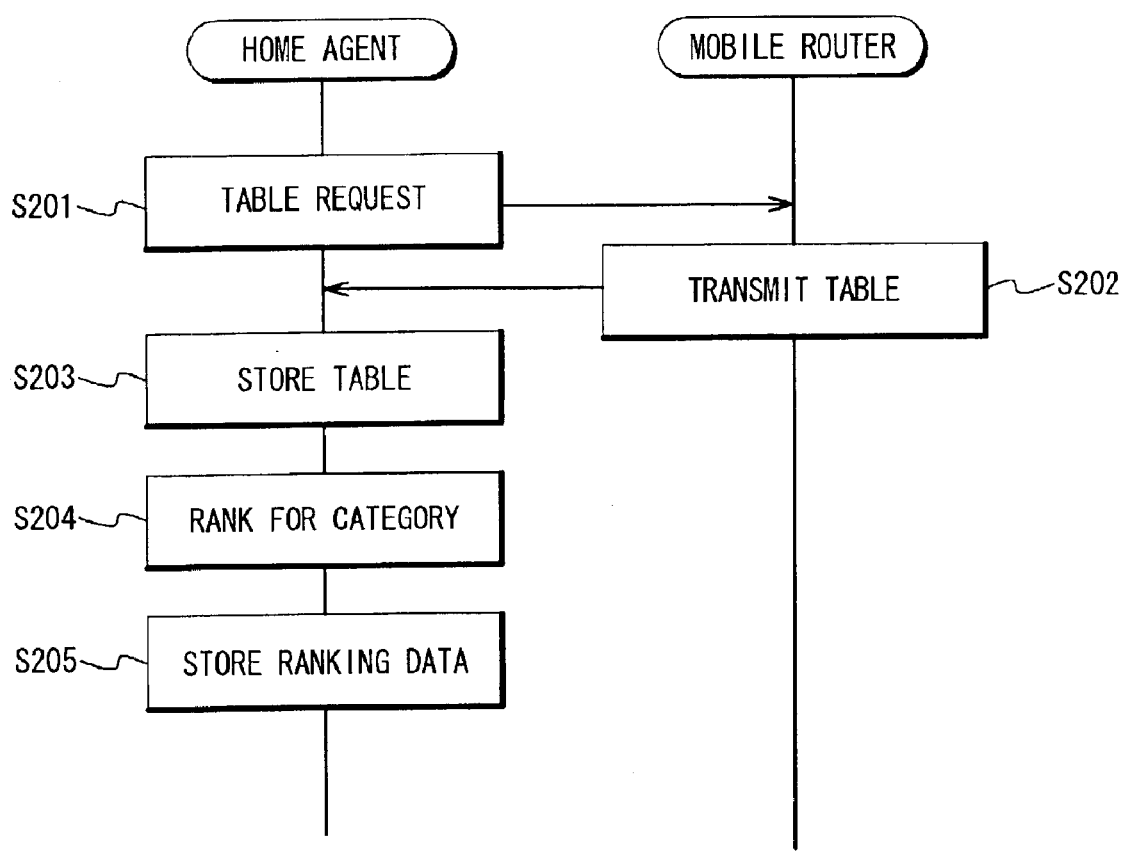
FIG. 6 is a sequence diagram showing a process flow when a mobile router provides statistic data to a home agent in the information delivery system according to the first embodiment of the present invention.

FIG. 6 is a sequence diagram showing the process when the mobile router $21_1$ provides the service data select table to the home agent 11.

The home agent 11 transmits a table request to the mobile router $21_1$ on an optional date, a day of a week or a time (Step S201). The mobile router $21_1$ transmits the service data select table with a router identifier thereof in response to the table request (Step S202).

The home agent 11 stores the service data select table received from the mobile router $21_1$ for every mobile router corresponding to the specific area (Step S203). Subsequently, the areas are ranked for every feature. For example, the area where many women in their twenties visit is the area A (Step S204). Then, the ranking data showing the ranking result is produced and stored in the subscriber data/interest data database 13, as shown in FIG. 7 (Step S205). As shown in FIG. 7, the ranking data is stored using the router identifier as a key. A network service provider prepares relation between the router identifier and the area. A category rule like the number of women in their twenties visiting an area in some time zone is determined based on a contract between the service provider and a data delivery servicer who needs the ranking data.

Next, the information delivery system according to the second embodiment of the present invention will be described with reference to FIG. 8. The information delivery system in the second embodiment has the same configuration as that of FIG. 1. However, the service data select table in each of the access destination domains is different from that of the first embodiment. In the service data select table in the second embodiment, one service data number is determined based on at least one of the feature of the user personal data.

The sequence diagram shows a process flow in the home agent 11 and the mobile router $21_1$ when service data is delivered to the mobile terminal 30 when the user with the mobile terminal 30 moves into the specific area of the access destination domain $20_1$.

The mobile router $21_1$ acquires the identifier of the mobile terminal 30 when the user with the mobile terminal 30 moves into the specific area of the access destination domain $20_1$ (Step S301). Subsequently, the mobile router $21_1$ transmits a user personal data request with the identifier of the mobile terminal 30 to the home agent 11 (Step S303). The home agent 11 receives the user personal data request and searches the subscriber data/interest data database 13 based on the identifier of the mobile terminal 30 in response to the request (Step S104), because the subscriber data and the interest data of the user personal data are accumulated in the database 13. Then, the home agent 11 transmits the searched user personal data to the mobile router $21_1$ (S305).

The mobile router $21_1$ receives the user personal data from the home agent 11 and refers to the service data select table to determine a service data number. Then, the mobile router $21_1$ transfers the service data number to the delivering server $22_1$. The delivering server $22_1$ searches the group of service data to determine service data corresponding to the service data number, and transmits the determined service data to the mobile terminal 30 (Step S306). In the second embodiment, for example, when the user personal data contains the sexuality and age of the user, the service data number corresponding to the sexuality and age of the user is selected.

In this case, a time zone may be added to the selection condition. Also, although it takes more time than in the first embodiment since the search operation carried out, the service data most fitting to the user can be provided to the user of the mobile terminal 30.

Figure 9:
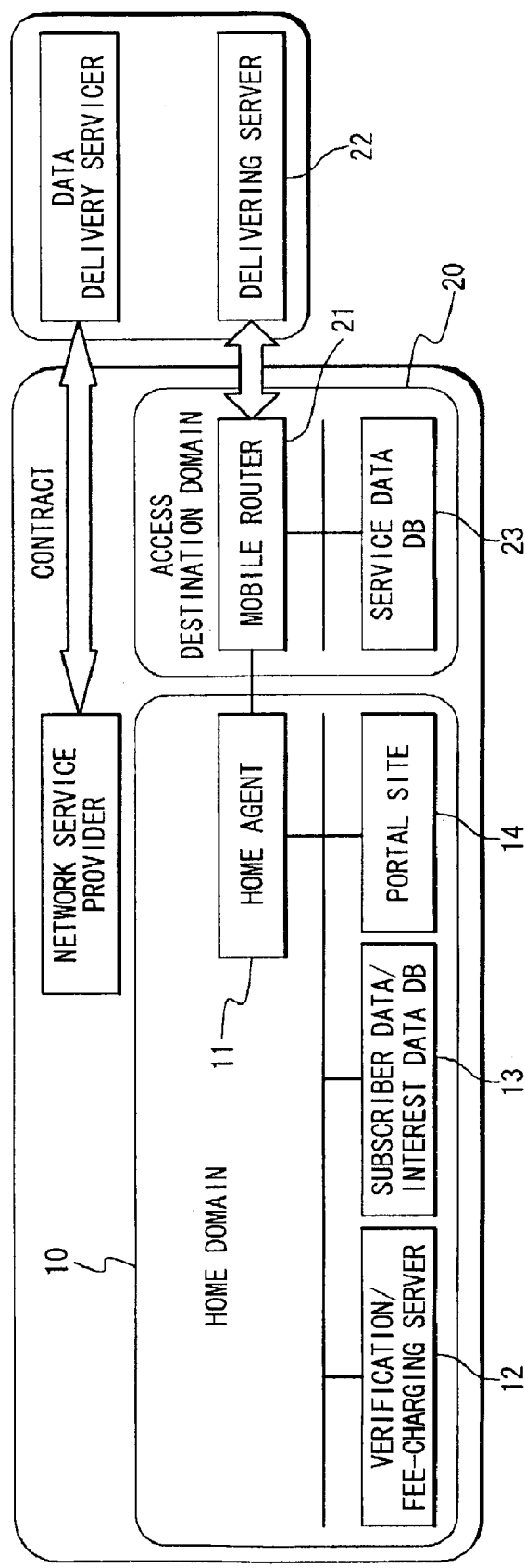
FIG. 9 is a sequence diagram showing an operation of the information delivery system according to the first or second embodiment of the present invention.

Next, another operation the information delivery system according to the first or second embodiment of the present invention will be described with reference to FIG. 9. In the information delivery system shown in FIG. 1, the network service provider managing a radio or cable communication network can supply the user personal data to the data delivery servicer providing data delivery service in the access destination domain $20_1$ based on a contract. However, in FIG. 9, the network service provider has an access destination domain 20 in addition to the home domain 10. The access destination domain 201 has the same configuration as that of the first or second embodiment.

When the contract between the network service provider and the data delivery servicer about the user personal data is changed, the home agent 11 transmits a service item change notice with change start date and time and change contents to the mobile router $21_1$ of the access destination domain $20_1$ via the mobile router $21_2$ of the access destination domain $20_2$. The mobile router $21_1$ returns a reply to the home agent 11 via the mobile router $21_2$ of the access destination domain $20_2$ to indicate acceptance of the service item change notice, if there is not a problem. Thus, the data delivery servicer can easily develop a data service business.

Figure 10:
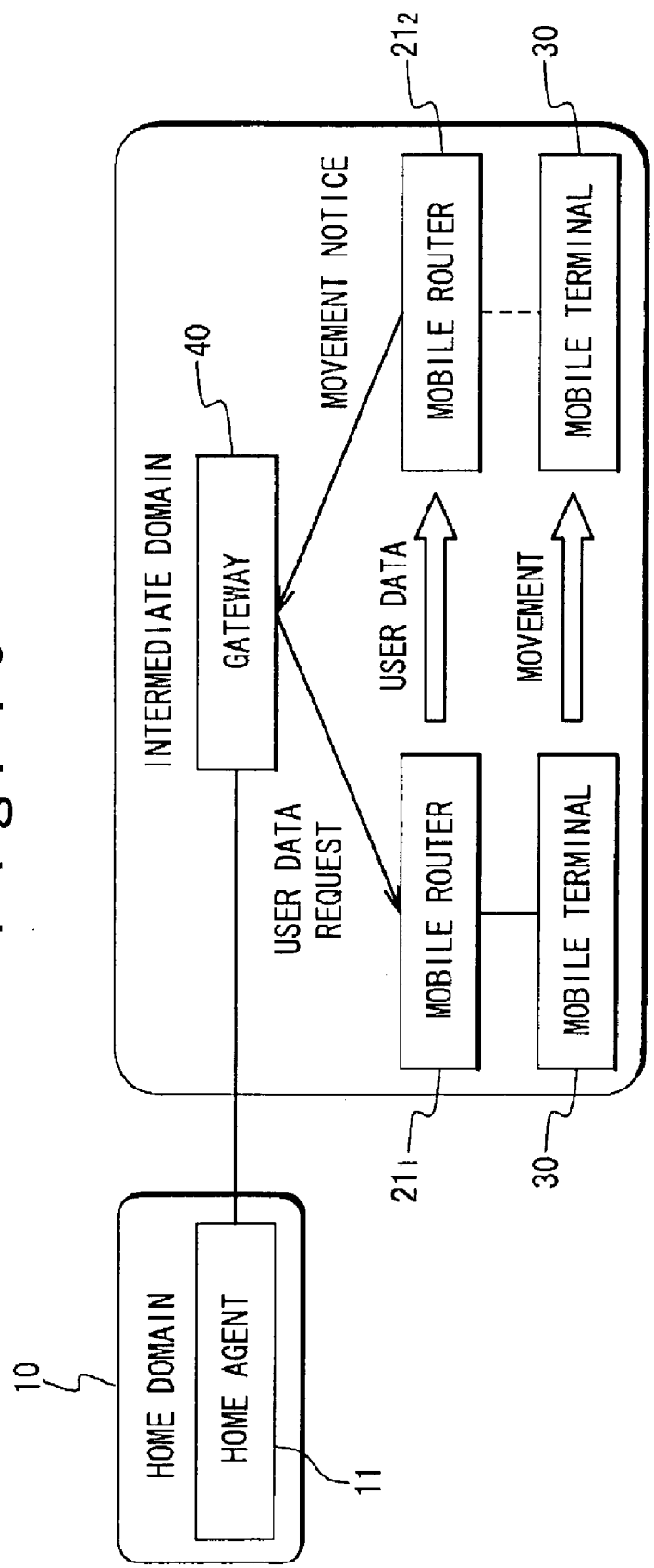
FIG. 10 is a functional diagram showing the structure and operation of the information delivery system according to a third embodiment of the present invention.

Next, the information delivery system according to the third embodiment of the present invention will be described with reference to FIG. 10. In FIG. 10, the information delivery system in the third embodiment is composed of the home domain 10 and an intermediate domain. The intermediate domain is composed of a plurality of access destination domains $20_1$ and $20_2$, and a gateway 40 which manages the mobile routes $21_1$ and $21_2$ of the access destination domains $20_1$ and $20_2$. The gateway 40 is composed of one or more data processors and provided for a wide area.

In the above-mentioned configuration, an operation when the user moves from the access destination domain $20_1$ for a first area of the wide area to the access destination domain $20_2$ for a second area of the wide area in the intermediate domain will be described with reference to FIG. 10. The mobile terminal 30 is originally located in the first area of the access destination domain $20_1$. Therefore, the access destination domain $20_1$ acquires and stores the user personal data, in the same way in the first or second embodiment.

Figure 3:
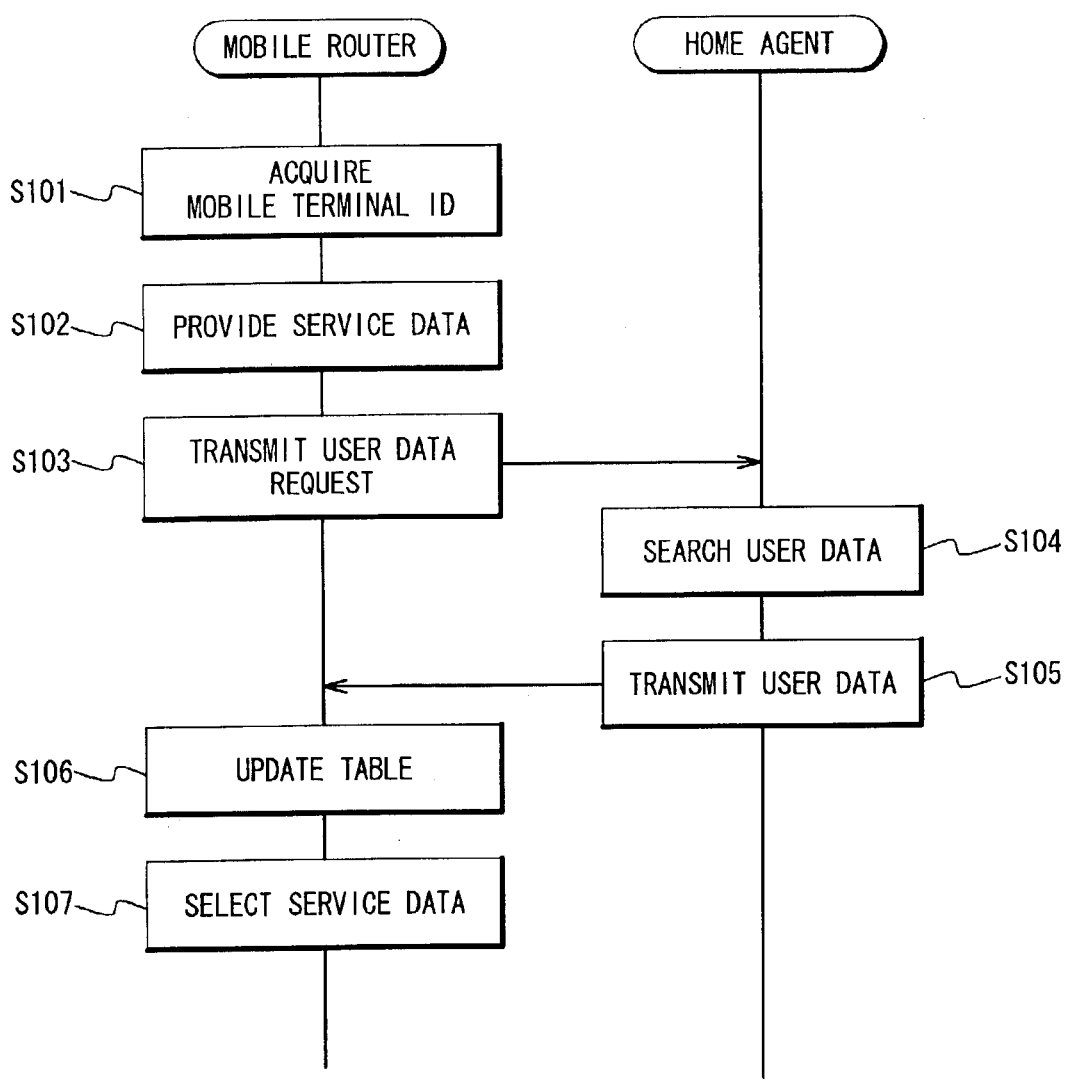
FIG. 3 is a sequence diagram showing an operation of the information delivery system according to the first embodiment of the present invention.
Figure 8:
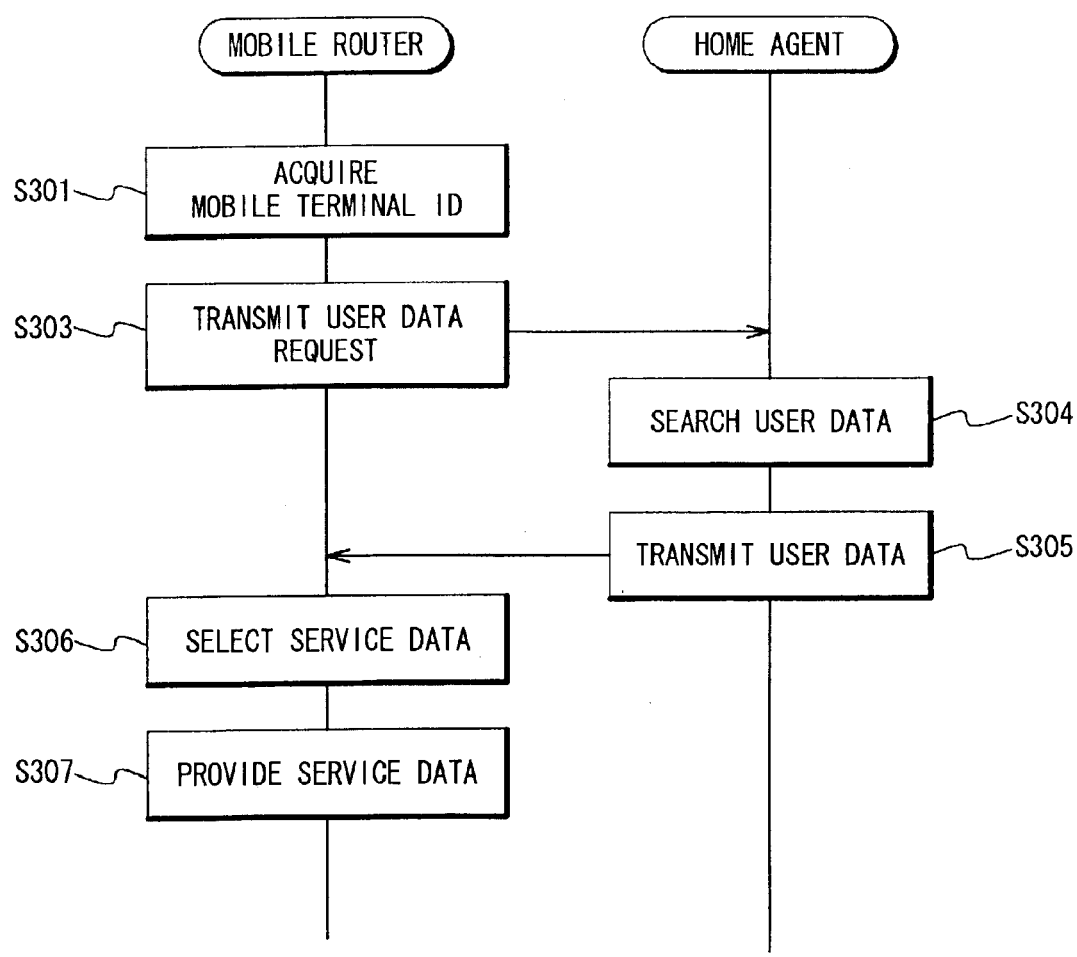
FIG. 8 is diagram showing an operation of the information delivery system according to a second embodiment of the present invention when a contract is changed.

In FIG. 10, when the user with the mobile terminal 30 comes into the second area of the access destination domain $20_2$ managed by the router $21_2$, the mobile router $21_2$ carries out the operation shown in FIG. 3 or 8. However, in this case, the mobile router $21_2$ transmits a movement notice with the identifier of the mobile terminal 30 to the gateway 40 instead of the user personal data request. The gateway 40 transmits the user personal data request with the identifier of the mobile terminal 30 and the router identifier of the mobile router $21_2$ of the access destination domain $20_2$ to the mobile router $21_1$ of the access destination domain $20_1$. The mobile router $21_1$ receives the user personal data request and transmits the stored user personal data corresponding to the identifier of the mobile terminal 30 to the mobile router $21_2$ based on the router identifier added to the user personal data request in response to the user personal data request. Then, the access destination domain $20_2$ operates as in the first or second embodiment. Also, the home domain 10 and the mobile router $21_2$ of the access destination domain $20_2$ operate as shown in FIG. 6, if necessary.

Figure 11:
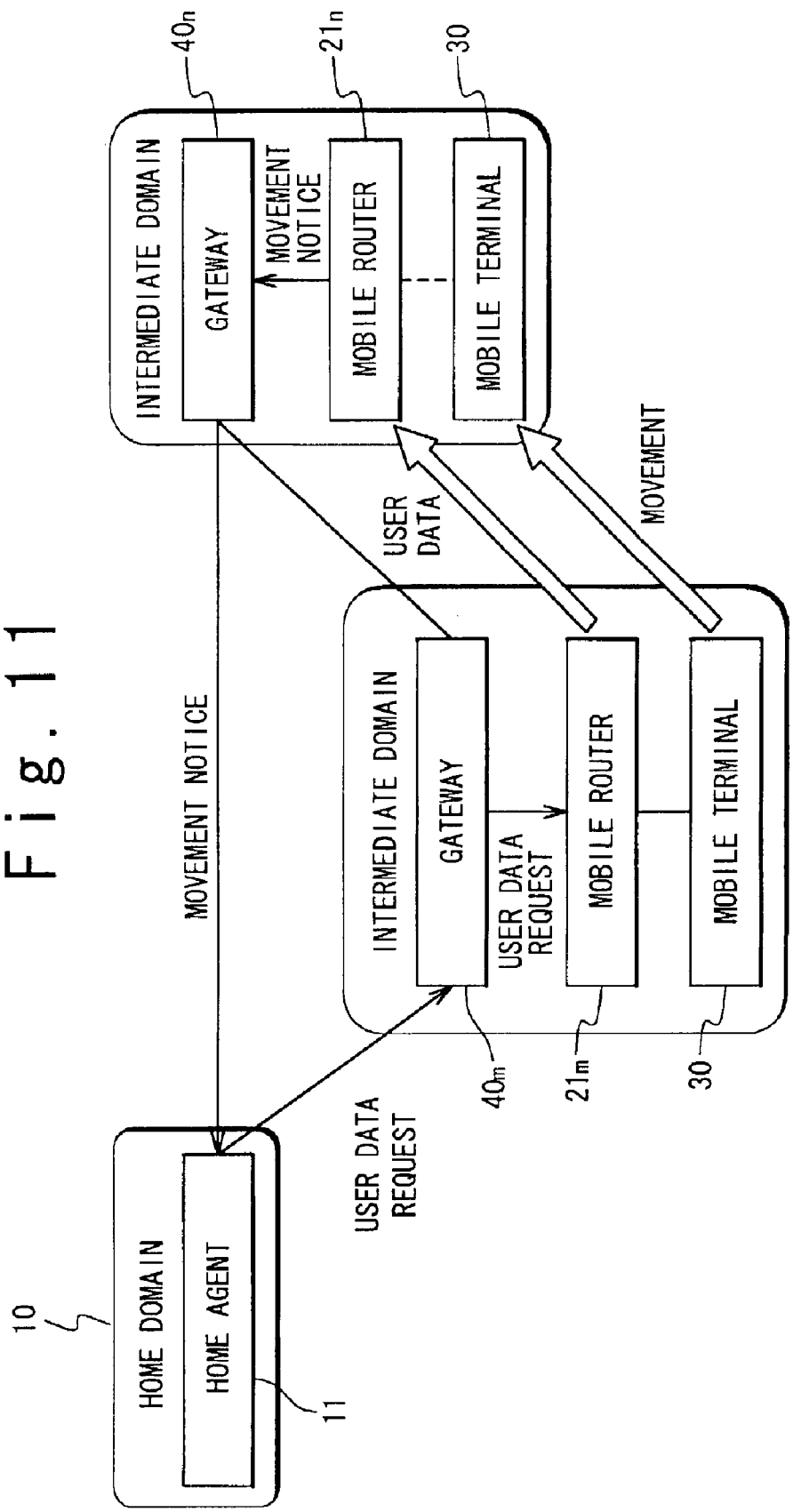
FIG. 11 is a diagram showing an operation of the information delivery system according to the fourth embodiment of the present invention.

Next, the information delivery system according to the fourth embodiment of the present invention will be described with reference to FIG. 11. In FIG. 11, the information delivery system in the fourth embodiment is composed of the home domain 10 and first and second intermediate domains. The first intermediate domain is composed of a gateway 40m and an access destination domain which has a mobile router 21m and is constructed in the same way as the access destination domain $20_1$. The second intermediate domain is composed of a gateway 40n and an access destination domain which has a mobile router 21n and is constructed in the same way as the access destination domain $20_1$. Each of the gateways 40m and 40n is composed of one or more data processors.

In the above-mentioned configuration, an operation when the user moves from the access destination domain 20m for a first area in the first intermediate domain to the access destination domain $20_2$ for a second area in the second intermediate domain will be described with reference to FIG. 11. The mobile terminal 30 is originally located in the first area of the access destination domain in the first intermediate domain. Therefore, the access destination domain $20_1$ acquires and stores the user personal data, in the same way in the first or second embodiment.

In FIG. 11, when the user with the mobile terminal 30 comes into the second area of the access destination domain 20n managed by the mobile router 21n, the mobile router 21n carries out the operation shown in FIG. 3 or 8. However, in this case, the mobile router 21n transmits a movement notice with an identifier of the mobile terminal 30 to the gateway 40n. The gateway 40n adds the router identifier of the mobile router 21n to the movement notice and transmits to the home agent 11 of the home domain 10. The home agent 40 transmits the user personal data request with the identifier of the mobile terminal 30 and the router identifier of the mobile router 21n to the gateway 40m. The gateway 40m transfers the user personal data request to the mobile router 21m of the access destination domain in the first intermediate domain. The mobile router 21m receives the user personal data request and transmits the stored user personal data corresponding to the identifier of the mobile terminal 30 to the mobile router 21n based on the router identifier added to the user personal data request in response to the user personal data request. Then, the access destination domain 20n operates as in the first or second embodiment. Also, the home domain 10 and the mobile router 21n of the access destination domain in the second intermediate domain operate as shown in FIG. 6, if necessary.

As described above, according to the present invention, the user of the mobile terminal who visits the specific area can easily receive the data service suitable for the life style and the interest of the himself and so on.

What is claimed is:

1. An information delivery system comprising:
   a mobile terminal of a user;
   a home domain; and
   an access destination domain for a specific area to which said mobile terminal currently belongs,
   wherein said access destination domain transmits a selected service data of a group of service data about said specific area to said mobile terminal when acquiring an identifier of said mobile terminal, and transmits a user personal data request with said identifier of said mobile terminal to said home domain, said home domain transmits user personal data corresponding to said identifier to said access destination domain in response to said user personal data request, said user personal data indicating features of said user, and said access destination domain updates statistic data based on said user personal data, and previously selects one of said group of service data as said selected service data based on the updated statistic data.

2. The information delivery system according to claim 1, wherein said home domain comprises:

a first database storing said user personal data; and a home agent which reads out said user personal data from said database based on said identifier of said mobile terminal in response to said user personal data request, and transmits the read out user personal data to said access destination domain.

3. The information delivery system according to claim 2, wherein said user personal data contains at least one of address, sexuality, age, occupation, annual income, interest, preferable maker and purchase account of said user.

4. The information delivery system according to claim 1, wherein said access destination domain comprises:

a second database which stores said group of service data;

a third database which stores said statistic data; and a mobile router which refers to said second database to read out said selected service data when acquiring said identifier of said mobile terminal, transmits said selected service data to said mobile terminal and said user personal data request to said home domain, receives said user personal data from said home domain, refers to said third database to update said statistic data based on said user personal data, and previously selects said selected service data from said group of service data based on the updated statistic data.

5. The information delivery system according to claim 4, wherein said access destination domain further comprises a timer, said second database stores a plurality of said service data for every user personal data and for every time zone, and said mobile router refers to said third database to update said statistic data based on said user personal data and a current time zone for a current time measured by said timer, and previously selects said selected service data from said group of service data based on the updated statistic data.

6. The information delivery system according to claim 5, wherein said home domain transmits a statistic data request to said access destination domain, said mobile router reads out said statistic data from said third database and transmits to said home domain, and said home domain generates and stores ranking data of a number of said users, from whose mobile terminals said mobile router acquires said identifiers, in units of said features of said user personal data.

7. An information delivery system comprising:

a mobile terminal of a user;

a network service provider system of a network service provider which has a home domain and a first access destination domain; and a data delivery servicer system of a data delivery servicer which has a second access destination domain for a specific area to which said mobile terminal currently belongs, said network service provider contracts with said data delivery servicer to provide user personal data, said user personal data indicating features of said user, wherein said second access destination domain transmits a selected service data of a group of service data about said specific area to said mobile terminal when acquiring an identifier of said mobile terminal, and transmits a user personal data request with said identifier of said mobile terminal to said home domain via said first access destination domain, said home domain transmits said user personal data corresponding to said identifier to said second access destination domain via said first access destination domain in response to said user personal data request, and said second access destination domain updates statistic data based on said user personal data, and previously selects one of said group of service data as said selected service data based on the updated statistic data.

8. The information delivery system according to claim 7, wherein said home domain comprises:

a first database storing said user personal data; and a home agent which reads out said user personal data from said first database based on said identifier of said mobile terminal in response to said user personal data request, and transmits the read out user personal data to said second access destination domain via said first access destination domain.

9. The information delivery system according to claim 8, wherein said user personal data contains at least one of address, sexuality, age, occupation, annual income, interest, preferable maker and purchase account of said user.

10. The information delivery system according to claim 7, wherein said second access destination domain comprises:

a second database which stores said group of service data;

a third database which stores said statistic data; and a mobile router which refers to said second database to read out said selected service data when acquiring said identifier of said mobile terminal, transmits said selected service data to said mobile terminal and said user personal data request to said home domain via said first access destination domain, receives said user personal data from said home domain via said first access destination domain, refers to said third database to update said statistic data based on said user personal data, and previously selects said selected service data from said group of service data based on the updated statistic data.

11. The information delivery system according to claim 10, wherein said access destination domain further comprises a timer, and said mobile router refers to said third database to update said statistic data based on said user personal data and a current time zone for a current time measured by said timer, and previously selects said selected service data from said group of service data based on the updated statistic data.

12. The information delivery system according to claim 11, wherein said home domain transmits a statistic data request to said access destination domain via said first access destination domain, said mobile router reads out said statistic data from said third database and transmits to said home domain via said first access destination domain, and said home domain generates and stores ranking data of a number of said users, from whose mobile terminals said mobile router acquires said identifiers, in units of said features of said user personal data.

13. The information delivery system according to claim 7, wherein when said contract is changed, said network service provider system sends a contract change notice to said second access destination domain via said first access destination domain, and said data delivery servicer system replies a permission to said home domain via said first access destination domain.

14. An information delivery system comprising:

a mobile terminal of a user;

a home domain which has a home agent; and a first intermediate domain for a first area, wherein said first intermediate domain comprises:

a first access destination domain for a second area in said first area;

a second access destination domain for a third area in said first area; and a gateway connected with said home domain, wherein when said mobile terminal enters said third area from said second area, said second access destination domain acquires an identifier of said mobile terminal, transmits a selected service data of a group of service data for said third area to said mobile terminal and transmits a movement notice with said identifier to said gateway, said gateway transmits a user personal data request with said identifier to said first access destination domain in response to said movement notice, said first access destination domain transmits user personal data corresponding to said identifier to said second access destination domain, said user personal data indicating features of said user, and said second access destination domain updates statistic data based on said user personal data, and previously selects one of said group of service data as said selected service data based on the updated statistic data.

15. The information delivery system according to claim 14, wherein said first access destination domain comprises:

a first database storing said user personal data; and a first mobile router which reads out said user personal data from said first database based on said identifier of said mobile terminal in response to said user personal data request, and transmits the read out user personal data to said second access destination domain.

16. The information delivery system according to claim 15, wherein said user personal data contains at least one of address, sexuality, age, occupation, annual income, interest, preferable maker and purchase account of said user.

17. The information delivery system according to claim 14, wherein said second access destination domain comprises:

a second database which stores said group of service data;

a third database which stores said statistic data; and a second mobile router which refers to said second database to read out said selected service data when acquiring said identifier of said mobile terminal, transmits said selected service data to said mobile terminal and said user personal data request to said home domain, receives said user personal data from said home domain, refers to said third database to update said statistic data based on said user personal data, and previously selects said selected service data from said group of service data based on the updated statistic data.

18. The information delivery system according to claim 17, wherein said second access destination domain further comprises a timer, said second database stores a plurality of said service data for every user personal data and for every time zone, and said second mobile router refers to said timer to determine a time zone, reads out said service data for said third area from said second database based on said user personal data and said time zone, and transmits the read out service data to said mobile terminal.

19. An information delivery system comprising:

a mobile terminal of a user;

a home domain which has a home agent;

a first intermediate domain for a first area, which has a first access destination domain and a first gateway; and a second intermediate domain for a second area, which has a second access destination domain and a second gateway, wherein when said mobile terminal enters said second area from said first area, said second access destination domain acquires an identifier of said mobile terminal, transmits a selected service data of a group of service data about said second area to said mobile terminal and transmits a movement notice with said identifier to said second gateway, said second gateway transmits said movement notice with said identifier to said home agent, said home agent transmits a user personal data request with said identifier to said first gateway in response to said movement notice, said first gateway transmits said user personal data request with said identifier to said first access destination domain, said first access destination domain transmits user personal data corresponding to said identifier to said second access destination domain, said user personal data indicating features of said user, and said second access destination domain updates statistic data based on said user personal data, and previously selects one of said group of service data as said selected service data based on the updated statistic data.

20. The information delivery system according to claim 19, wherein said first access destination domain comprises:

a first database storing said user personal data; and a first mobile router which reads out said user personal data from said first database based on said identifier of said mobile terminal in response to said user personal data request, and transmits the read out user personal data to said second access destination domain.

21. The information delivery system according to claim 20, wherein said user personal data contains at least one of address, sexuality, age, occupation, annual income, interest, preferable maker and purchase account of said user.

22. The information delivery system according to claim 19, wherein said second access destination domain comprises:

a second database which stores said group of service data;

a third database which stores said statistic data; and a second mobile router which refers to said second database to read out said selected service data when acquiring said identifier of said mobile terminal, transmits said selected service data to said mobile terminal and said user personal data request to said home domain, receives said user personal data from said home domain, refers to said third database to update said statistic data based on said user personal data, and previously selects said selected service data from said group of service data based on the updated statistic data.

23. The information delivery system according to claim 22, wherein said second access destination domain further comprises a timer,
  said second database stores a plurality of said service data for every user personal data and for every time zone,
  said second mobile router refers to said timer to determine a time zone, reads out said service data for said second area from said second database based on said user personal data and said time zone, and transmits the read out service data to said mobile terminal.

24. An information delivery system comprising:
  a mobile terminal of a user;
  a home domain; and
  an access destination domain for a specific area to which said mobile terminal currently belongs,
  wherein said access destination domain transmits a user personal data request with an identifier of said mobile terminal to said home domain when said mobile terminal enters said specific area,
  said home domain transmits user personal data corresponding to said identifier to said access destination domain in response to said user personal data request, said user personal data indicating features of said user, and
  said access destination domain determines a selected service data of a group of service data about said specific area based on said user personal data, and transmits said selected service data to said mobile terminal.

25. The information delivery system according to claim 24, wherein said home domain comprises:
  a first database storing said user personal data; and
  a home agent which reads out said user personal data from said first database based on said identifier of said mobile terminal in response to said user personal data request, and transmits the read out user personal data to said access destination domain.

26. The information delivery system according to claim 25, wherein said user personal data contains at least one of address, sexuality, age, occupation, annual income, interest, preferable maker and purchase account of said user.

27. The information delivery system according to claim 24, wherein said access destination domain comprises:
  a second database which stores service data; and
  a mobile router which receives said user personal data from said home domain, reads out said service data for said specific area from said second database based on said user personal data, and transmits the read out service data to said mobile terminal.

28. The information delivery system according to claim 27, wherein said access destination domain further comprises a timer,
  said second database stores a plurality of said service data for every user personal data and for every time zone,
  said mobile router refers to said timer to determine a time zone, reads out said service data for said specific area from said second database based on said user personal data and said time zone, and transmits the read out service data to said mobile terminal.

29. An information delivery system comprising:
  a mobile terminal of a user;
  a network service provider system of a network service provider which has a home domain and a first access destination domain; and
  a data delivery servicer system of a data delivery servicer which has a second access destination domain for a specific area to which said mobile terminal currently belongs, said network service provider contracts with said data delivery servicer to provide user personal data, said user personal data indicating features of said user,
  wherein said second access destination domain transmits a user personal data request with an identifier of said mobile terminal to said home domain via said first access destination domain, when said mobile terminal enters said specific area,
  said home domain transmits said user personal data corresponding to said identifier to said second access destination domain via said first access destination domain in response to said user personal data request, and
  said second access destination domain determines a specific service data of a group of service data based on said user personal data and transmits said specific service data to said mobile terminal.

30. The information delivery system according to claim 29, wherein said home domain comprises:
  a first database storing said user personal data; and
  a home agent which reads out said user personal data from said first database based on said identifier of said mobile terminal in response to said user personal data request, and transmits the read out user personal data to said second access destination domain via said first access destination domain.

31. The information delivery system according to claim 30, wherein said user personal data contains at least one of address, sexuality, age, occupation, annual income, interest, preferable maker and purchase account of said user.

32. The information delivery system according to claim 29, wherein said second access destination domain comprises:
  a second database which stores said group of service data; and
  a mobile router which acquires said identifier of said mobile terminal when said mobile terminal enters said specific area, transmits said user personal data with said identifier to said home domain via said first access destination domain, receives said user personal data from said home domain via said first access destination domain, refers to said second database based on said user personal data to determine said specific service data, and transmits said specific service data to said mobile terminal.

33. The information delivery system according to claim 30, wherein said second access destination domain further comprises a timer,
  said second database stores said group of service data for feature of said user personal data and for every time zone,
  said mobile router refers to said timer to determine a time zone, reads out said specific service data for said specific area from said second database based on said user personal data and said time zone, and transmits the read out specific service data to said mobile terminal.

34. The information delivery system according to claim 29, wherein when said contract is changed, said network service provider system sends a contract change notice to said second access destination domain via said first access destination domain, and
  said data delivery servicer system replies a permission to said home domain via said first access destination domain.

35. An information delivery system comprising:
  a mobile terminal of a user;
  a home domain which has a home agent; and a first intermediate domain for a first area, wherein said first intermediate domain comprises:
a first access destination domain for a second area in said first area;
a second access destination domain for a third area in said first area; and
a gateway connected with said home domain,
wherein when said mobile terminal enters said third area from said second area, said second access destination domain acquires an identifier of said mobile terminal, and transmits a movement notice with said identifier to said gateway,
said gateway transmits a user personal data request with said identifier to said first access destination domain in response to said movement notice,
said first access destination domain transmits user personal data corresponding to said identifier to said second access destination domain, said user personal data indicating features of said user, and
said second access destination domain determines a specific service data of a group of service data based on said user personal data and transmits said specific service data for said third area to said mobile terminal.

36. The information delivery system according to claim 35, wherein said first access destination domain comprises:
a first database storing said user personal data; and
a first mobile router which reads out said user personal data from said first database based on said identifier of said mobile terminal in response to said user personal data request, and transmits the read out user personal data to said second access destination domain.

37. The information delivery system according to claim 36, wherein said user personal data contains at least one of address, sexuality, age, occupation, annual income, interest, preferable maker and purchase account of said user.

38. The information delivery system according to claim 35, wherein said second access destination domain comprises:
a second database which stores said group of service data; and
a second mobile router which receives said user personal data from said first access destination domain, reads out said specific service data for said third area from said second database based on said user personal data, and transmits the read out specific service data to said mobile terminal.

39. The information delivery system according to claim 38, wherein said second access destination domain further comprises a timer,
said second database stores a plurality of said service data for every user personal data and for every time zone,
said second mobile router refers to said timer to determine a time zone, reads out said specific service data for said third area from said second database based on said user personal data and said time zone, and transmits the read out specific service data to said mobile terminal.

40. An information delivery system comprising:
a mobile terminal of a user;
a home domain which has a home agent;
a first intermediate domain for a first area, which has a first access destination domain and a first gateway; and a second intermediate domain for a second area, which has a second access destination domain and a second gateway,
wherein when said mobile terminal enters said second area from said first area, said second access destination domain acquires an identifier of said mobile terminal, and transmits a movement notice with said identifier to said second gateway,
said second gateway transmits a user personal data request to said home agent,
said home agent transmits a user personal data request with said identifier to said first gateway in response to said movement notice,
said first gateway transmits said user personal data request with said identifier to said first access destination domain,
said first access destination domain transmits user personal data corresponding to said identifier to said second access destination domain, said user personal data indicating features of said user, and
said second access destination domain determines a specific service data of a group of service data based on said user personal data and transmits said specific service data for said second area to said mobile terminal.

41. The information delivery system according to claim 40, wherein said first access destination domain comprises:
a first database storing said user personal data; and
a first mobile router which reads out said user personal data from said first database based on said identifier of said mobile terminal in response to said user personal data request, and transmits the read out user personal data to said second access destination domain.

42. The information delivery system according to claim 41, wherein said user personal data contains at least one of address, sexuality, age, occupation, annual income, interest, preferable maker and purchase account of said user.

43. The information delivery system according to claim 40, wherein said second access destination domain comprises:
a second database which stores said group of service data; and
a second mobile router which acquires said identifier of said mobile terminal when said mobile terminal enters said second area from said first area, transmits said movement notice with said identifier to said second gateway, receives said user personal data from said first access destination domain, reads out said specific service data for said second area from said second database based on said user personal data, and transmits the read out specific service data to said mobile terminal.

44. The information delivery system according to claim 43, wherein said second access destination domain further comprises a timer,
said second database stores a plurality of said service data for every user personal data and for every time zone,
said second mobile router refers to said timer to determine a time zone, reads out said specific service data for said second area from said second database based on said user personal data and said time zone, and transmits the read out specific service data to said mobile terminal.

* * * * *